United States Patent Office 2,944,080
Patented July 5, 1960

2,944,080

PENTACHLOROBENZENESULFENYL HALIDES

Howard Johnston, Concord, Calif., assignor to The Dow Chemical Company, Midland, Mich., a corporation of Delaware No Drawing. Filed Nov. 23, 1956, Ser. No. 623,761

3 Claims. (Cl. 260—543)

This invention relates to the pentachlorobenzenesulfenyl halides having the formula

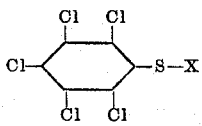

wherein X represents chlorine or bromine. These compounds are crystalline solids, somewhat soluble in many organic solvents and of low solubility in water. They are useful in introducing the pentachlorobenzenesulfenyl moiety into more complex organic compounds such as reaction with amines to yield sulfenamides or reaction with ketones to yield substituted ketones. More specifically, the compounds of the present invention may be reacted with acrolein, the resulting product treated with sodium bicarbonate and thereafter brominated to produce pentachlorophenylthio-2,3-dibromopropionaldehyde which is valuable as a fungicide.

The new compounds may be prepared by the reaction of chlorine or bromine with pentachlorobenzenethiol. The reaction is carried out in the presence of an inert organic solvent such as carbon tetrachloride or hexane. The reaction is somewhat exothermic and takes place smoothly at temperatures of from 10° to 40° C. with the formation of the desired product and hydrogen chloride or hydrogen bromide of reaction. The temperature may be controlled by regulating the rate of contacting the reactants and by external cooling. Good results are obtained when at least one molecular proportion of chlorine or bromine is employed with each molecular proportion of pentachlorobenzenethiol.

In carrying out the reaction, the chlorine or bromine may be added portionwise to the pentachlorobenzenethiol dissolved in the reaction solvent. In an alternative procedure, the pentachlorobenzenethiol is added portionwise to a solvent solution of the bromine or chlorine. In either case, the addition is carried out with stirring and at a temperature of from 10° to 40° C. Upon completion of the reaction, the reaction mixture may be fractionally distilled under reduced pressure to separate reaction solvent and obtain the desired product as a crystalline residue. The latter may be purified by recrystallization from organic solvents.

The following examples illustrate the invention but are not to be construed as limiting:

Example 1.—Pentachlorobenzenesulfenyl chloride

Forty grams (0.142 mole) of pentachlorobenzenethiol was added portionwise with stirring to a solution of 14 grams (0.197 mole) of chlorine in 350 milliliters of carbon tetrachloride. The addition was carried out in 10 minutes and at a temperature of 25° C. When the addition was complete, the solvent was removed by evaporation under reduced pressure to obtain a pentachlorobenzenesulfenyl chloride product as a solid, orange-colored residue. This solid product was dried and found to melt at 102°–103° C. It contained 10.25 percent sulfur and 67.2 percent chlorine compared to the calculated values of 10.1 percent and 67.3 percent, respectively.

Example 2.—Pentachlorobenzenesulfenyl bromide

Pentachlorobenzenethiol in the amount of 14.1 grams (0.05 mole) was added portionwise with stirring to a solution of 9.6 grams (0.06 mole) of bromine in 200 milliliters of hexane. The addition was carried out over a period of 10 minutes and at room temperature. Following the addition, the reaction mixture was allowed to stand for 10 minutes at room temperature before removing the hydrogen bromide of reaction under a slight vacuum. The resulting mixture was then cooled in Dry Ice to precipitate a pentachlorobenzenesulfenyl bromide product as a reddish-brown solid. This solid was separated by filtration and found to melt at 50° C.

The new pentachlorobenzenesulfenyl halides of the present invention are useful as intermediates in the preparation of more complex organic compounds as for example pentachlorophenylthio - 2,3 - dibromopropionaldehyde. Thus, equimolecular proportions of pentachlorobenzenesulfenyl chloride or bromide and acrolein may be reacted in an inert organic solvent at about room temperature to produce a pentachlorophenylthio-halopropionaldehyde intermediate. This intermediate is then dehydrohalogenated by treatment with an equimolar amount of a dehydrohalogenating agent such as sodium bicarbonate in an inert solvent and at the boiling temperature of the mixture to obtain a pentachlorophenylthioacrolein product. The latter product is finally brominated in a solvent such as chloroform at or about room temperature and the reaction mixture thereafter fractionally distilled under reduced pressure to remove the solvent and obtain the pentachlorophenylthio-2,3-dibromopropionaldehyde product as a residue. In a representative operation, pentachlorophenylthio-2,3 - dibromopropionaldehyde was dispersed in an aqueous suspension comprising the spores of Rhizoctonia solani to prepare a spore suspension containing 10 parts by weight of the propionaldehyde per million parts by weight of ultimate mixture. After 24 hours, the suspension was plated on a nutrient agar and the plates incubated for 3 days at 25° C. Inspection of the plates following the incubation period showed that pentachlorophenylthio-2,3-dibromopropionaldehyde had given a 100 percent kill of Rhizoctonia solani.

I claim:

1. A pentachlorobenzenesulfenyl halide having the formula

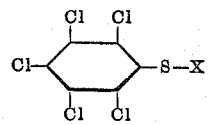

in which X represents a member of the class consisting of chlorine and bromine.

2. Pentachlorobenzenesulfenyl chloride.

3. Pentachlorobenzenesulfenyl bromide.

References Cited in the file of this patent

UNITED STATES PATENTS 2,774,707    Birum _____ Dec. 18, 1956